United States Patent [19]

Pringle

[11] Patent Number: 4,577,654

[45] Date of Patent: Mar. 25, 1986

[54] FLUID ACTUATED PIPELINE VALVE

[75] Inventor: Ronald E. Pringle, Houston, Tex.

[73] Assignee: Camco, Incorporated, Houston, Tex.

[21] Appl. No.: 742,683

[22] Filed: Jun. 10, 1985

[51] Int. Cl.$^4$ .......................................... F16K 31/124
[52] U.S. Cl. .................................... 137/219; 251/330
[58] Field of Search ............... 137/219, 220; 251/62, 251/330

[56] References Cited

U.S. PATENT DOCUMENTS

| 401,588 | 4/1889 | Ray | 251/330 |
| 2,962,040 | 11/1960 | Simmons | 137/219 |
| 3,747,618 | 7/1973 | Boes | 251/62 X |
| 4,234,009 | 11/1980 | Fuchs | 137/219 |

FOREIGN PATENT DOCUMENTS

| 1065785 | 9/1959 | Fed. Rep. of Germany | 251/62 |
| 1116487 | 11/1961 | Fed. Rep. of Germany | 137/219 |
| 1200088 | 9/1965 | Fed. Rep. of Germany | 251/62 |

Primary Examiner—Gerald A. Michalsky
Attorney, Agent, or Firm—Fulbright & Jaworski

[57] ABSTRACT

A vertically positioned valve body having a valve seat positioned coaxially in the body in a horizontal plane. A valve element positioned upstream of the seat and axially movable in the body. The cross-sectional area of the valve element is approximately one-half of the cross-sectional area of the body around the valve element. A plurality of diametrically opposed piston and cylinder assemblies raise the valve element away from the valve seat and allow the valve element to seat by gravity and fluid flow. Guide means are provided between the valve element and the body for guiding the valve element. A sealing valve and seat are positioned upstream of the valve seat about each of the assemblies for sealing off the assemblies when the valve is closed.

1 Claim, 2 Drawing Figures

FLUID ACTUATED PIPELINE VALVE

BACKGROUND OF THE INVENTION

In large pipelines, such as 36-inch pipelines, it is conventional to use a large rotating ball element to open and close the valve. Such ball valves require a high torque to close the valve and also require a considerable amount of time to close the valve, which is undesirable in emergencies.

The present invention is directed to a pipeline valve which may be quickly closed in an emergency in which the valve element moves coaxially in the valve body for seating, is actuated by a plurality of piston and cylinder assemblies, and which has a minimum restriction to fluid flow.

SUMMARY

The present invention is directed to a pipeline valve which includes a body, a valve seat positioned coaxially in the body and in a plane transverse to the longitudinal axis of the body with a valve element positioned upstream of the seat and axially movable in the body for movement towards and away from the valve seat. The cross-sectional area of the valve element is substantially less than the cross-sectional area of the body thereby reducing the restriction of flow through the body by the valve element when the valve is open. A plurality of piston and cylinder assemblies are connected between the valve element and the valve body for moving the valve element away from the valve seat. Guide means are provided between the valve element and the body for axially guiding the valve element in the body.

Still a further object of the present invention is wherein the body is vertically positioned and the weight of the valve element and fluid flow acts to move the valve element towards the seat to a closed position.

Still a further object of the present invention is wherein the cross-sectional area of the valve element is approximately one-half of the cross-sectional area of the body about the valve element and the cross-sectional area of the pipeline is approximately equal to the cross-sectional area of the valve element.

Yet a still further object of the present invention is the provision of a fluid power line connected to the piston and cylinder assemblies with a restriction in the power line for controlling the rate of closure of the valve element.

A still further object of the present invention is the provision of sealing valve and seat means positioned upstream of the valve seat about each of the piston and cylinder assemblies and adapted to close and seal off said assemblies when the valve is closed.

Still a further object is wherein the valve element is circular and includes a tapering face directed upstream for reducing the force of fluid flow on the valve element.

A still further object is wherein the piston and cylinder assemblies are in communcation with the exterior of the body at a location downstream of the valve seat for repair of the assemblies when the valve is closed.

A further object is wherein the piston and cylinder assemblies are hydraulic and are diametrically opposed to each other and positioned parallel to the longitudinal axis of the body.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figure 1:
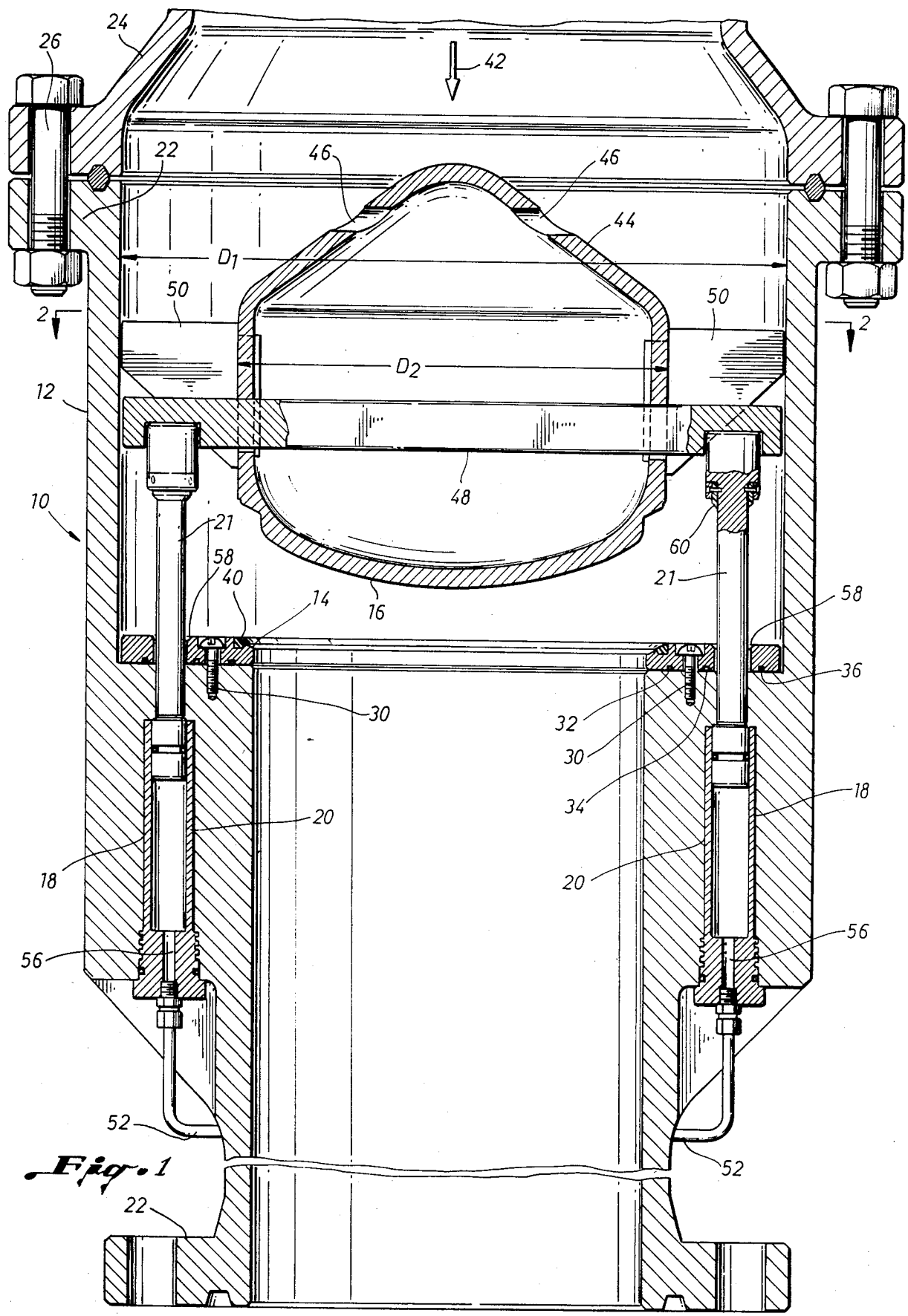
FIG. 1 is an elevational view, in cross section, of the valve of the present invention shown in the open position.
Figure 2:
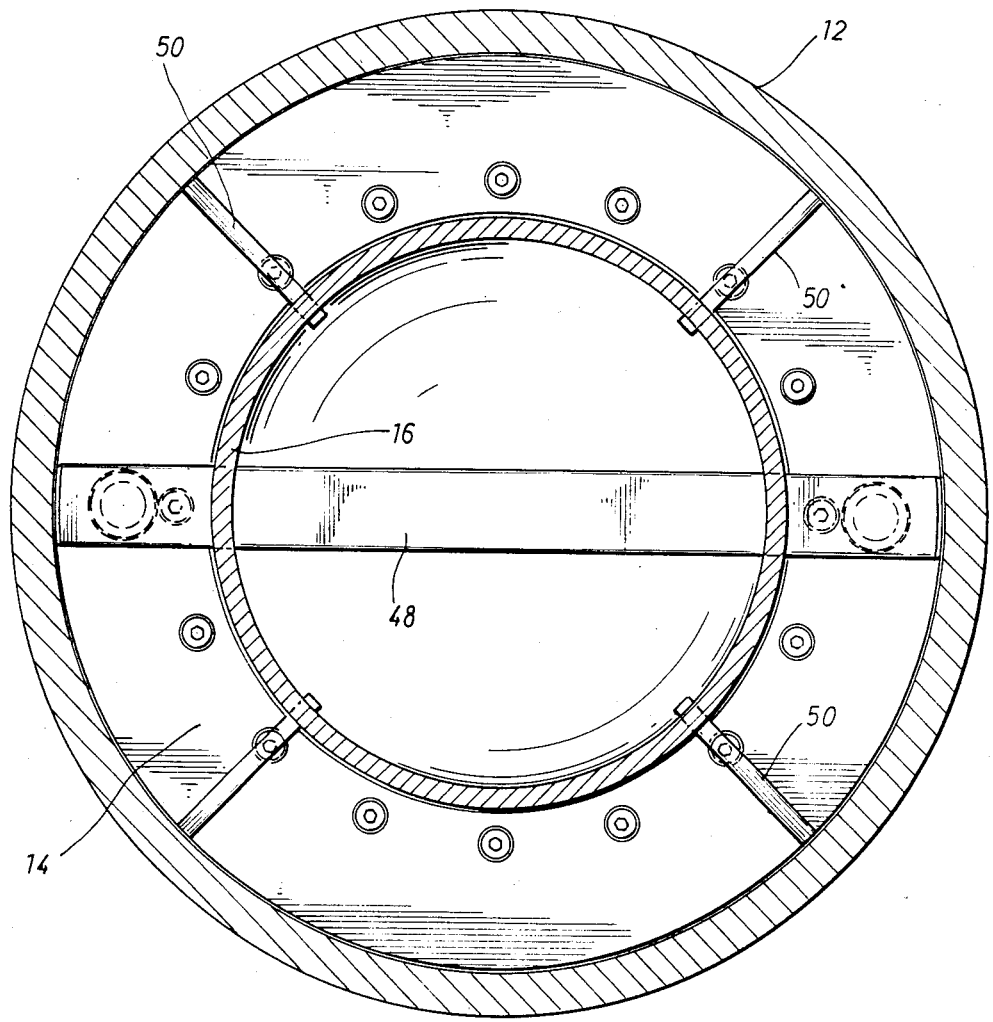
FIG. 2 is a cross-sectional view taken along the lines 2—2 of FIG. 1.

Referring now to the drawings, the reference numeral 10 generally indicates the pipeline valve of the present invention which is particularly useful for use in large pipelines, such as 36-inch pipelines, for quickly closing flow through the pipeline in case of an emergency. The valve 10 includes a body 12, a valve seat 14, a valve element 16, and a plurality of piston and cylinder assemblies 18 for moving the valve element 16 away from the valve seat 14.

The body 12 is preferably circular and includes connecting means at each end such as flanges 22 for connection in a pipeline 24 such as by bolts 26. As will be discussed more fully herein, it is preferable that the body 12 is vertically positioned in the pipeline 24. The body 12 includes a section having a diameter D1 which is substantially greater than the diameter D2 of the valve element 16 whereby the cross-sectional area of the valve 16 is substantially less than the cross-sectional area of the body portion at the diameter D1 around the valve element 16 thereby reducing the restriction of fluid flow through the body by the valve element 16 when the valve 10 is open. Preferably, the cross-sectional area of the valve element 16 is approximately one-half of the cross-sectional area of the body section at the diameter D1. In addition, the cross-sectional area at D2 of the valve element 16 is approximately equal to the cross-sectional area of the pipeline 24 in which the valve 10 is connected.

The valve seat 14 is positioned coaxially in the body 12 in a plane transverse to the longitudinal axis of the body 12 or horizontally positioned in the case of a vertical body 12. The seat 14 may be in the form of a ring which is secured to the body 12 by a plurality of screws 30 and sealed by one or more seals 32 and 33 and 36, and may include a resilient seat member 40.

The direction of flow through the body 12 is indicated by the arrow 42, that is from the top towards the bottom of the valve body 12. The valve element 16 is positioned upstream of the valve seat 14 and is axially movable in the body 12 towards and away from the valve seat 14. The force of the fluid flow through the body 12 acts to seat the element 16 on seat 17. Preferably the valve element 16 is circular and includes a tapering face 44 directed upstream for reducing the force of the fluid flow through the pipeline on the valve element 16. The valve element 16 may also include holes 46 for pressure compensating the inside and outside of the valve element 16 as well as providing lift holes for supporting the valve element while installing or repairing the valve element 16.

Preferably the valve element 16 is supported from a cross bar support 48 which in turn is connected to the piston and cylinder assemblies 18. With the valve 12 in the vertical position, and upon release of control fluid from the hydraulic piston and cylinder assemblies 18 and 20, the valve element 16 will move downwardly by the action of fluid flow and by gravity because of its weight and seat on the valve seat 14. For example only, the valve element in a 36-inch valve may weigh approximately 1200 pounds thereby eliminating the need for a positive closing force for moving the valve element 16 onto the valve seat 14.

A plurality of guide means such as centralizer fins 50 may be connected between the valve element 16 and the inside of the body 12 for axially guiding the valve element 16 as it moves in the body 12.

The piston and cylinder assemblies 18 are preferably hydraulically actuated and connected to a common control line 52 and include two assemblies 18 diametrically positioned in the body 12. One of the piston and cylinder such as the cylinders 20 may be connected in the body 12 and the other such as the piston 21 may be connected to the cross bar support 48 and thus to the valve element 16. In one embodiment, the operating pistons are small in diameter such as 2.5 inches each thereby having a combined hydraulic area of 10 square inches. This minimizes the operating pressure to approximatly 200 psi over line pressure, but most importantly requires only a small amount of fluid displacement from the piston and cylinder assemblies 18 to close the valve 10, such as 90 cubic inches which is less than a half a gallon. Therefore, when pressure is released from the piston and cylinder assemblies 18, the valve may close quickly, such as in one second, but the time for closure may be controlled by providing restrictions or orifices 56 in communication with the control line 52. It is to be particularly noted that the piston and cylinder assemblies 18 are in communication with the exterior of the body 12 at a location downstream of the valve seat 14 whereby the fittings may be removed for repair of the piston and cylinder assemblies 18 when the valve 10 is closed.

However, in order to insure that the valve body does not leak through the piston and cylinder assemblies 18 when the valve is closed and the assemblies 18 are being repaired, a sealing valve and seat means is positioned upstream of the valve seat 14 about each of the piston and cylinder assemblies 18 and adapted to close and seal off the assemblies when the valve is closed. Thus, the rods of pistons 21 may extend through a circular valve seat 58 which is engaged by a sealing valve element 60 when the element 16 seats on the valve seat 14 to close off communication around the piston rods 21. In some cases, depending upon the amount of trash or debris in the pipeline, it may be preferable to reverse the positions of the sealing seat 58 and valve element 60 in order to prevent dirt or trash from collecting around the sealing seat 58. However, fluid flow through the valve will tend to keep the sealing seats 58 clean.

As has been indicated, it is preferable that the valve 10 be operated in the vertical position. However, if desired, the valve could be operated in the horizontal position by providing a closing force, in addition to fluid flow, to positively close the valve element 16 on the seat 14 such as making the piston and cylinder assemblies 18 double acting. In a horizontal position, it is also desirable that the guides 50 include low friction type guides such as rollers. And while the valve 10 could be operated with the direction of flow reversed from that shown, the present verticaly directed valve with the fluid flow in the pipeline being downardly provides a more simple, inexpensive and positively acting valve.

In use, the hydraulic piston and cylinder assemblies 18 are actuated to move the valve element 16 upwardly and allow fluid flow through the valve 10. When it is desired to close the valve, the control fluid through the line 52 is released allowing the valve element 16 to close with a quick closing action. In fact, the restrictions 56 may be provided to slow down the closing action to prevent damage to the valve.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. A pipeline valve comprising,
a vertically positioned body,
a valve seat positioned coaxially in the body in a horizontal plane,
a valve element positioned upstream of said seat and axially movable in the body for movement towards and away from the valve seat whereby the weight of the valve element acts to move the valve element towards the seat,
the cross-sectional area of the valve element being substantially less than the cross-sectional area of the body thereby reducing the restriction of flow through the body by the valve element when the valve is opened,
first and second hydraulic piston and cylinder assemblies positioned in the body and connected between the valve element and the valve body for moving the valve element away from the valve seat, said first and second assemblies being diametrically opposed to each other and parallel to the longitudinal axis of the body,
sealing valve and seat means positioned upstream of said valve seat about each piston and cylinder assembly and adapted to close and seal off said assemblies when the valve is closed,
said piston and cylinder assemblies being in communication with the exterior of the body at a location downstream of the valve seat for repairing the assemblies when the valve is closed, and
guide means between the valve element and the body for axially guiding the valve element in the body.

* * * * *